United States Patent [19]

Maskell et al.

[11] Patent Number: 4,776,759
[45] Date of Patent: Oct. 11, 1988

[54] DRY SUN PUMP SEAL

[75] Inventors: Bruce W. Maskell, Suisun; Jeff R. Soule, Concord, both of Calif.

[73] Assignee: Jacuzzi Whirlpool Bath, Walnut Creek, Calif.

[21] Appl. No.: 130,798

[22] Filed: Dec. 9, 1987

[51] Int. Cl.$^4$ ............................................. F04D 29/58
[52] U.S. Cl. ................. 415/170 A; 415/177; 277/22; 277/81 R
[58] Field of Search ............. 415/170 R, 170 A, 175, 415/177, 178, 180; 277/22, 32, 81 R, 26

[56] References Cited

U.S. PATENT DOCUMENTS

| Re. 32,027 | 11/1985 | Hyatt et al. | 417/368 |
|---|---|---|---|
| 2,684,196 | 7/1954 | Wood. | |
| 3,217,656 | 11/1965 | Oakes. | |
| 3,259,071 | 7/1966 | Nellis et al. | 415/177 |
| 3,826,589 | 7/1974 | Frank et al. | 277/22 |
| 3,895,811 | 7/1975 | Richard, Jr. et al. | 277/22 |
| 4,114,899 | 9/1978 | Kulzer et al. | 277/22 |
| 4,191,386 | 3/1980 | Hershey | 277/22 |
| 4,518,325 | 5/1985 | Kingston | 417/368 |

Primary Examiner—Robert E. Garrett
Assistant Examiner—John T. Kwon
Attorney, Agent, or Firm—Limbach, Limbach & Sutton

[57] ABSTRACT

An improved drive shaft seal including a first sealing ring to be mounted within a housing, a second sealing ring to be mounted within the housing in contact with the first sealing ring in such a manner that one ring rotates relative to the other, and a thermally conductive cup having an end portion to be mounted in contact with one of the rings within the housing and a wall portion extending outside the housing. Heat is dissipated from the rings through the cup to the atmosphere surrounding the housing. In a preferred embodiment, the wall portion of the cup is perforated and ring-shaped so as to have large surface area and a large surface area-to-volume ratio. In another preferred embodiment, a fan is mounted outside the housing so as to blow air past the wall portion of the cup. The invention may be embodied in a pump, in which the first sealing ring is attached to the pump drive shaft so as to rotate with the drive shaft. The second sealing ring is mounted so as to remain stationary with respect to the housing.

23 Claims, 1 Drawing Sheet

DRY SUN PUMP SEAL

FIELD OF THE INVENTION

The invention relates to drive shaft seals for containing fluid within a housing and preventing the fluid from escaping through an orifice which admits a drive shaft into the housing. More particularly, the invention relates to drive shaft seals which include heat dissipation means, and to pumps including such seals.

BACKGROUND OF THE INVENTION

Conventional pumps and other devices often include a drive shaft which extends into a housing through an orifice in the housing for rotating elements within the housing, and a drive shaft seal for preventing fluid from escaping from within the housing through the orifice. One type of drive shaft seal includes a rotating sealing ring fixedly connected to the drive shaft in the orifice and a stationary sealing ring fixedly connected to the housing in the orifice. A surface of the rotating ring is pressed against a mating surface of the stationary ring, for example by a spring, so as to prevent fluid from flowing between the rings as the rotating ring rotates relative to the stationary ring.

When the drive shaft rotates, friction between the rings results in generation of heat. Under normal operating conditions, when a thermally conductive fluid is present within the housing, heat typically flows from one of the rings into the fluid so as to cool the rings. This occurs in conventional pumps of the type including a drive shaft which rotates an impeller immersed in a fluid, and in which the fluid is in contact with one of the sealing rings.

However, when highly thermally conductive fluid (such as water) within the housing is replaced by fluid having lower thermal conductivity (such as air), less heat is dissipated away from the sealing rings. High sealing ring temperatures may result, and may cause damage to the seal, housing, or other components within the housing. A fluid leak is a likely consequence.

Use of a heat dissipating means to mitigate this problem has been proposed, for example, in U.S. Pat. No. 3,826,589, issued July 30, 1974 to Frank, et al. U.S. Pat. No. 3,826,589 discloses a pump having a plastic housing, and a drive shaft extending into the interior of the housing. Carbon insert 37, which is attached to (and rotates with) the drive shaft, is pressed against and rotates relative to stationary ceramic insert 40. Insert 40 presses against stationary sealing ring 41. Sealing ring 41 in turn presses thermally conductive, frustoconical shield 43 against the housing. The shield is shaped so that even when the water level within the pump falls to a low level, a portion of the shield is immersed in the water. Thus, heat is conducted from inserts 37 and 40 through ring 41 and shield 43 to the water.

However, if the water level within the pump of U.S. Pat. No. 3,826,589 were to fall so far that shield 43 were no longer immersed in the water, the U.S. Pat. No. 3,826,589 system would not efficiently dissipate heat away from the drive shaft seal (i.e., from inserts 37 and 40). Further, the design of the U.S. Pat. No. 3,826,589 pump has the disadvantage that the heat dissipating shield contacts the fluid within the pump, so that fluid flow within the pump is affected by the shield and the shield is subject to corrosion and other undesirable effects due to exposure to the fluid.

A more complicated heat dissipation means is disclosed in U.S. Pat. No. 4,114,899, issued Sept. 19, 1978 to Kulzer, et al. The mechanical seal of U.S. Pat. No. 4,114,899 includes ring 19 (connected to drive shaft 4) which rotates relative to ring 20 (connected to housing 23). The seal is cooled, not only by fluid supplied from fluid volume B contained within the housing, but by conduction of heat from ring 20 through housing sections 23a, 23b, and 23c to the atmosphere surrounding the housing. In one embodiment, the outer surface of housing 23 has ribs 35a, 35b, and 35c extending therefrom. In another embodiment (described with reference to FIG. 2 of U.S. Pat. No. 4,114,899), the outer surface of the housing has a recess (35d) into which fan 50 blows air to assist in heat transfer from the housing's outer surface to the surrounding atmosphere.

However, the seal disclosed in U.S. Pat. No. 4,114,899 is undesirably complicated, and would not facilitate efficient heat transfer to the surrounding atmosphere unless the housing consists of material with high thermal conductivity. This decreases design flexibility by preventing use of other housing materials which happen to have low thermal conductivity, though their other properties may be desirable for intended system applications. Further, the configuration of the U.S. Pat. No. 4,114,899 system, including the shape of the housing's external surface in the U.S. Pat. No. 4,114,599 system, is not optimal for dissipating heat from the drive shaft seal to the surrounding atmosphere.

It has not been known until the present invention how to design a drive shaft seal in a manner eliminating the deficiencies and disadvantages of conventional drive shaft seals such as those described above.

SUMMARY OF THE INVENTION

The invention is an improved drive shaft seal including a first sealing ring mounted within a housing, a second sealing ring mounted within the housing in contact with the first sealing ring in such a manner that one ring rotates relative to the other, and a thermally conductive cup having an end portion in contact with one of the rings and a wall portion extending outside the housing. Heat is dissipated from the rings through the cup to the atmosphere surrounding the housing. The wall portion of the cup is preferably sized and shaped so as to have a large surface area and a large surface area-to-volume ratio. In a preferred embodiment, the cup has a perforated, generally cylindrical wall portion extending outside the housing. In another preferred embodiment, a fan is mounted outside the housing so as to blow air past the wall portion outside the housing.

The invention may be embodied in a pump, in which the first sealing ring is attached to the pump drive shaft so as to rotate as a unit with the drive shaft. The second sealing ring is mounted within the housing in such a manner as to remain stationary with respect to the housing when the second ring rotates in contact with the first ring. The end portion of the cup may be connected to the second ring in such a manner that the cup remains stationary with respect to the housing. Alternatively, the end portion of the cup may be fixed to the first ring so as to rotate as a unit with the first ring and the drive shaft.

DETAILED DESCRIPTION OF THE PREFERRED EMBODIMENTS

Figure 1:
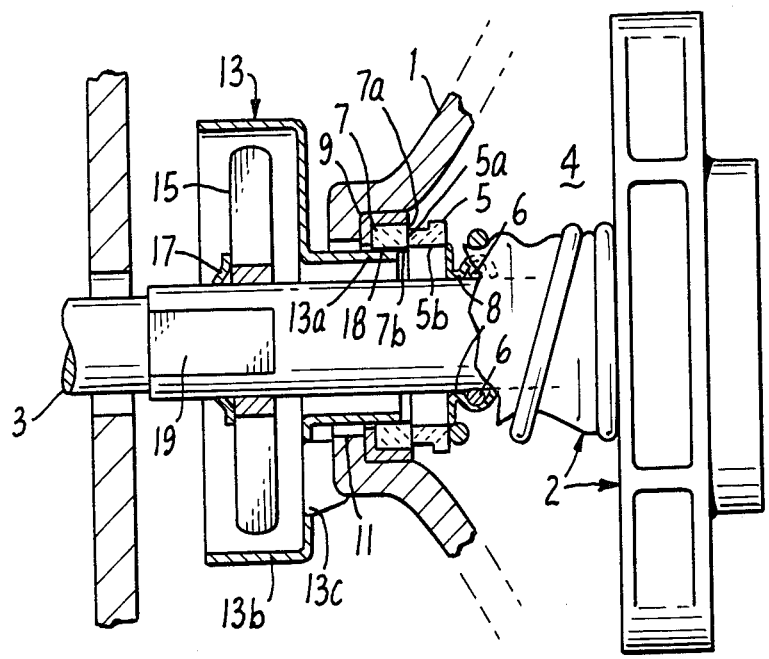
FIG. 1 is a side view, partially in cross-section, of a pump embodying the invention.

FIG. 1 shows a pump constructed in accordance with a preferred embodiment of the invention. The pump housing comprises portion 1 and portion 2. Drive shaft 3 extends into the pump housing through orifice 11 in housing portion 1. First sealing ring 5, second sealing ring 7, and sealing member prevent fluid 4 within the pump housing from escaping through orifice 11. Ring 5 is fixedly attached to drive shaft 3, for example by seal 6 and spring member 8. Thus, ring 5, seal 6, and spring member 8 rotate as a unit relative to housing portion 1. Sealing member 9 is press fitted between housing portion 1 and second sealing ring 7. Thus, housing portion 1, member 9, and sealing ring 7 remain stationary when ring 5 rotates relative thereto.

First ring 5 is preferably composed of carbon and second ring 7 is preferably composed of ceramic material. Ring 5 is pressed by spring member 8 against ring 7, so that surface 5a of ring 5 is pressed sufficiently tightly against surface 7a of ring 7 to prevent significant fluid flow past these adjacent surfaces. When shaft 3 rotates relative to housing portion 1, surface 5a rotates relative to surface 7a, and heat will be generated as a result of the friction between surfaces 5a and 7a.

End portion 13a of thermally conducting cup 13 is press fitted into contact with second sealing ring 7. Friction between end portion 13a and second sealing ring 7 will thus prevent cup 13 from rotating relative housing portion 1. Cup 13 extends outward from within housing portion 1 so that wall portion 13b of cup 13, which is shaped and sized so as to have a large surface area and a large surface area-to-volume ratio, is in direct contact with the atmosphere surrounding housing portions 1 and 2. In the embodiment shown in FIGS. 1 and 2, wall portion 13b which extends outside housing portion 1 is cylindrical. Cup 13 is preferably composed of a highly thermally conductive material such as copper. Heat generated due to friction between rings 5 and 7 will be transferred directly from ring 7 to end portion 13a of cup 13, from end portion 13a to wall portion 13b, and from wall portion 13b directly to the surrounding atmosphere. Preferably, thermally conductive substance 18 occupies the region between ring 7 and end portion 13a to increase the efficiency of heat transfer from ring 7 to cup 13. In one preferred embodiment, thermally conductive substance is an adhesive layer which bonds ring 7 to end portion 13a, so that these two elements need not be press fitted together. In an alternative embodiment in which cup 13 is connected to first ring 5 rather than to second ring 7, cup 13 may be press fitted to ring 5 or bonded to ring 5 by an adhesive layer.

Figure 2:
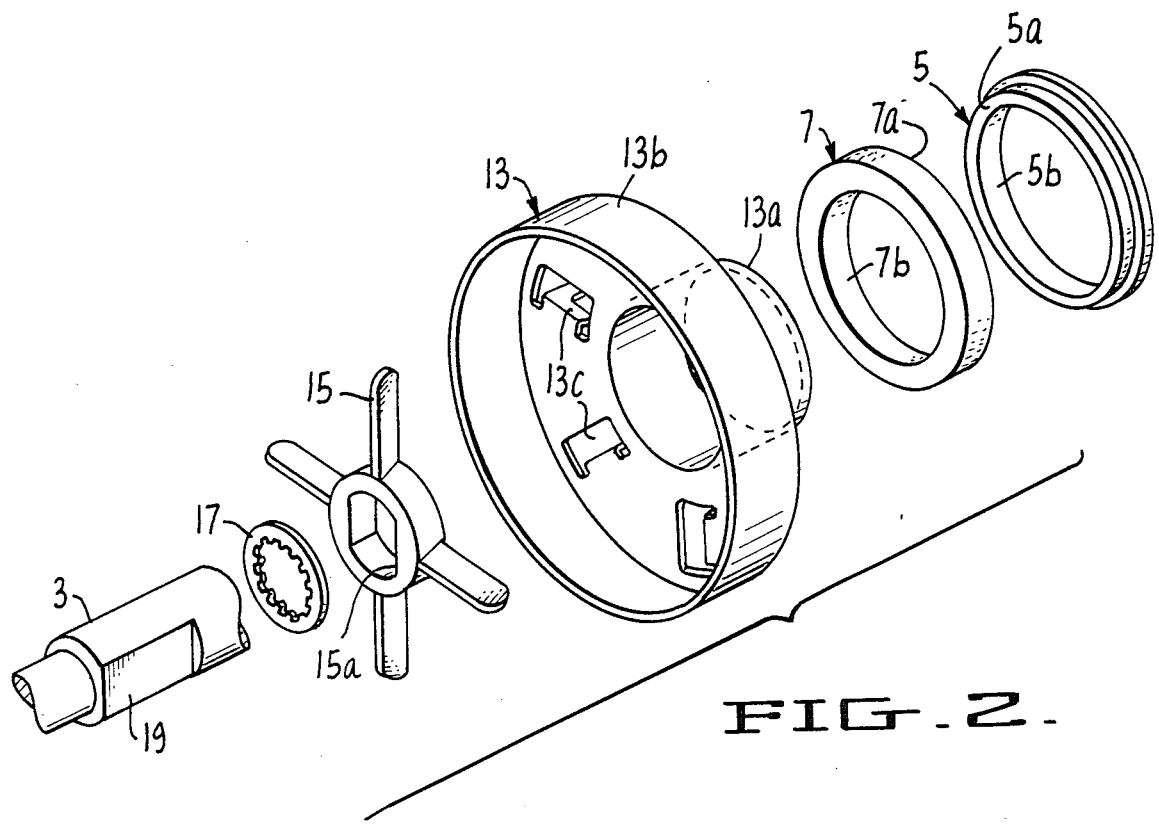
FIG. 2 is an exploded perspective view of a preferred embodiment of a drive shaft seal in accordance with the invention.

Preferably, as shown in FIG. 2, wall 13b includes perforations 13c, to increase heat transfer from portion 13b to the atmosphere.

In a preferred embodiment, fan 15 blows air against wall portion 13b, and preferably through perforations 13c to cool wall portion 13b. Fan 15 is held against shaft 3 by retainer 17.

FIG. 2 illustrates the seal elements of the FIG. 1 pump. Surface 7a of ring 7 is held against surface 5a of ring 5. End portion 13a of cup 13 is press fitted against inner surface 7b of ring 7. Inner surface 15a of fan 15 receives the portion of shaft 3 that includes flat surface 19 (and another flat surface, not shown, on the opposite side of shaft 3), so that fan 15 will rotate as a unit with shaft 3 relative to cup 13.

Although cup 13 is directly attached to stationary ring 7 in the FIG. 1 embodiment, in an alternative embodiment, cup 13 may be attached directly to rotating ring 5 rather than to ring 7. In such alternative embodiment, inner surface 5b of ring 5 would have diameter less than the diameter of inner surface 7b of ring 7. Thus, end portion 13a of cup 13 could be press fitted in direct contact with ring 7 while remaining separated from ring 5. Thus, in this embodiment cup 13 would rotate as a unit with ring 7 and shaft 3, relative to housing portion 1. Accordingly, in this embodiment, it would be preferred that fan 15 be rotatably attached to shaft 3 and held fixed with respect to housing portion 1 so that cup 13 is capable of rotating relative to the fan.

The foregoing description is merely explanatory and illustrative of the invention. It is contemplated that numerous variations on the embodiments described above may be within the scope of the invention as defined by the appended claims.

What is claimed is:

1. A seal, for restricting fluid flow from within a housing, including:
   a first sealing ring adapted to be mounted within the housing;
   a second sealing ring adapted to be mounted within the housing in contact with the first sealing ring so that one of the sealing rings is free to rotate relative to the other sealing ring, but so that fluid flow between the first ring and the second ring is restricted; and
   a thermally conductive cup having an end portion and a wall portion, said end portion adapted to be mounted within the housing in contact with one of the rings so that the wall portion extends outside the housing.

2. The seal of claim 1, also including a fan adapted to be mounted outside the housing for cooling the wall portion of the cup.

3. The seal of claim 1, wherein the wall portion is perforated.

4. The seal of claim 1, wherein the second ring is adapted to be mounted stationary with respect to the housing and the first ring is adapted to be rotatably mounted within the housing.

5. The seal of claim 4, wherein the end portion of the cup is dimensioned so as to be capable of being press fitted in direct contact with the second ring so that the cup is stationary with respect to the housing.

6. The seal of claim 5, also including a thermally conductive substance coated on the end portion of the cup so as to occupy the region between the second ring and the end portion of the cup when the end portion is fitted in contact with the second ring, so as to increase the efficiency of heat transfer from the second ring to the end portion.

7. The seal of claim 4, wherein the end portion of the cup is dimensioned so as to be capable of being press fitted in direct contact with the first ring so that the cup rotates as a unit with the first ring relative to the housing.

8. The seal of claim 1, wherein the second ring is mounted so as to be stationary with respect to the housing and the first ring is mounted so as to rotate relative to the housing, and also including a thermally conductive adhesive which bonds the second ring to the end portion of the cup.

9. The seal of claim 1, wherein the cup is made of copper.

10. The seal of claim 1, wherein the first ring is composed of carbon and the second ring is composed of ceramic material.

11. A pump, including:
   a housing defining an interior for containing fluid, and having an orifice for receiving a drive shaft;
   a drive shaft extending through the orifice into the interior of the housing; and
   a drive shaft seal for preventing significant fluid flow from the housing interior through the orifice, and including a first sealing ring mounted within the housing interior and a second sealing ring mounted within the housing interior in contact with the first sealing ring in such a manner that the one of the sealing rings ring is capable of rotating relative to the other sealing ring; and
   a thermally conductive cup having an end portion in contact with one of the rings, and having a wall portion extending outside the housing.

12. The pump of claim 11, also including a fan mounted outside the housing for cooling the wall portion of the cup.

13. The pump of claim 11, wherein the wall portion is perforated.

14. The pump of claim 11, wherein the second ring is mounted so as to be stationary with respect to the housing and the first ring is connected to the drive shaft in such a manner as to rotate as a unit with the drive shaft relative to the housing.

15. The pump of claim 14, wherein the end portion of the cup is press fitted in direct contact with the second ring so that the cup is stationary with respect to the housing.

16. The pump of claim 15, also including a thermally conductive substance which occupies a region between the second ring and the end portion of the cup, so as to increase the efficiency of heat transfer from the second ring to the end portion.

17. The pump of claim 15, also including a fan mounted outside the housing on the drive shaft so as to rotate as a unit with respect to the drive shaft relative to the housing.

18. The pump of claim 14, wherein the end portion of the cup is press fitted in direot contact with the first ring so that the cup rotates as a unit with the first ring relative to the housing.

19. The pump of claim 18, also including a fan mounted outside the housing.

20. The pump of claim 11, wherein the second ring is stationary with respect to the housing and the first ring is mounted on the drive shaft so as to rotate as a unit with the drive shaft relative to the housing, and also including a thermally conductive adhesive which bonds the second ring to the end portion of the cup.

21. The pump of claim 20, also including a fan mounted outside the housing on the drive shaft so as to rotate as a unit with the drive shaft relative to the housing.

22. The pump of claim 11, wherein the cup is made of copper.

23. The pump of claim 11, wherein the first ring is composed of carbon and the second ring is composed of ceramic material.

* * * * *

UNITED STATES PATENT AND TRADEMARK OFFICE
CERTIFICATE OF CORRECTION

PATENT NO.   : 4,776,759
DATED        : October 11, 1988
INVENTOR(S)  : Bruce W. Maskell and Jeff R. Soule It is certified that error appears in the above—identified patent and that said Letters Patent is hereby corrected as shown below:

On the cover page, delete the title "DRY SUN PUMP SEAL" and insert in lieu thereof --DRY RUN PUMP SEAL--.

In column 1, line 1, delete the title "DRY SUN PUMP SEAL" and insert in lieu thereof -- DRY RUN PUMP SEAL--.

Signed and Sealed this

Seventh Day of March, 1989

*Attest:*

DONALD J. QUIGG

*Attesting Officer*          *Commissioner of Patents and Trademarks*